Figure 1:
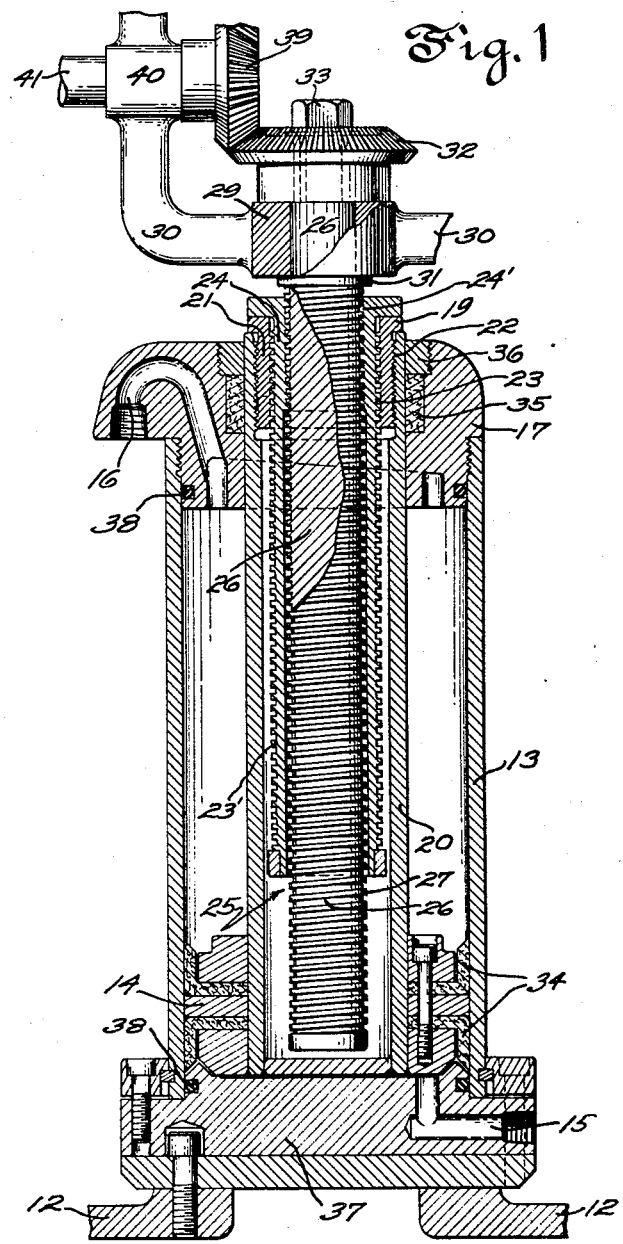

April 26, 1960  M. WAHLSTROM  2,934,319
HYDRAULIC JACK
Filed June 20, 1956

INVENTOR
Magnus Wahlstrom,
BY
ATTORNEY

United States Patent Office 2,934,319
Patented Apr. 26, 1960

2,934,319

HYDRAULIC JACK

Magnus Wahlstrom, Easton, Conn., assignor to The Bridgeport Machines, Inc., Bridgeport, Conn., a corporation of Connecticut Application June 20, 1956, Serial No. 592,526

1 Claim. (Cl. 254—93)

This invention relates to hydraulic cylinders incorporating within the hydraulically motivated piston rod structure a jack screw, which may or need not comprise a composite screw, for manually elevating or lowering the work carrying table of a machine tool manually when desired as well as by power through the medium of hydraulic pressure. This kind of jack is sometimes associated with the knee or elevatable work table support in a milling machine especially in conjunction with duplicating attachments operative to control vertical feeding of the work in relation to a stationed cutting tool. Such use of a hydraulic cylinder and screw jack is illustrated in U.S. Patent No. 2,508,587.

An object of the present improvements is to strengthen and simplify construction of the mechanism in that particular region where a jack screw engages with a hydraulic piston rod by means of translating screw threads and in a manner to permit disassemblage of various screw threaded parts that are relatively thin-walled and in telescopic relation in their portions occupying the fluid containing space within the hydraulic cylinder.

A contributory object is to attain jack screw elevating movement of a higher extent within a minimum of vertical space occupied by the cylinder above the floor and beneath the knee of a milling machine.

These and other objects of the improvement will appear in greater particular from the following description of a successful embodiment of the invention having reference to the appended drawing wherein Fig. 1 is a view of a combined hydraulic cylinder and jack screw embodying the invention.

Disclosure of a typical use to which a combined hydraulic cylinder and jack screw can be put, specifically in connection with a milling machine, appears in United States Patent No. 2,508,587.

Herein the base of such a milling machine or other machine tool is represented in the drawing at 12. It serves to support the hollow hydraulic cylinder 13 in which there is a vertically slidable hollow piston 14 actuated both upward and downward by fluid pressure. The fluid enters through either the passageway 15, which gives to a space within the cylinder below piston 14, or through a passageway 16 which gives to a space within the cylinder above piston 14. When fluid under pressure is delivered through passageway 15 accompanied by reduction of pressure in the fluid above piston 14 the piston is forced upward. When fluid under pressure is delivered through passageway 16 accompanied by reduction of pressure of the fluid below piston 14 the piston is caused to move downward.

Piston 14 is fixed to a hollow piston rod 20 with a fluid tight seal between these parts. Hollow rod 20 is fitted internally at its open top end by a plug bushing 21 whose fine pitched external screw threads at 22 have permanent fastening engagement with internal, preferably V-type screw threads in the top end portion of the piston rod. Bushing 21 is thereby secured in fixed relation within the top open end of the piston rod and internally is provided with strong relatively high-pitched translating screw threads 23, preferably of the Acme type, in working mesh with mating external screw threads 23' on the outer component or shell section 24 of a composite jack screw 25. An inner or core section component 26 of the composite jack screw 25 is telescopically contained within the shell section 24 and has external screw threads 27 in translating engagement with the internal threads 24' of shell section 24, likewise preferably of the Acme type. Threads 24' extend over only a minor upper portion of the length of shell section 24, the remainder and major lower portion of whose length is counterbored to provide a non threaded clearance within shell 24 for the externally threaded core section 26.

Core section 26 may constitute a solid rod having a rotary bearing 29 in a web or knee bridge 30 of the part of the machine tool that is to be raised and lowered by the jack screw relatively to the machine base 12, such as the elevatable, work table supporting knee of a milling machine. Bearing 29 accordingly rests on a shoulder 31 of core rod 26. Rod 26 extends above bearing 29 and thereat is keyed to a bevel pinion 32 which is retained on the rod fixedly by a nut 33.

To seal the enclosure of the space for pressure liquid in cylinder 13 leather packing rings 34 are carried by piston 14 for rubbing against the internal surface of the cylinder wall. A fluid tight, compressible, slide permitting, seal is maintained between the stationary cylinder head 17 and the vertically slidable piston rod 20 by a gland 35 of conventional type. Gland 35 is compressed in a counterbore in the cylinder head, to bear against the piston rod, by a thrust ring 36 threading into the cylinder head. Additional fluid sealing packings may be introduced at joints between cylinder 13 and its head 17 and bed block 37 as at 38.

For elevating or lowering the knee of a milling machine with which bearing 29 is united the bevel gear 32 is rotated in one or another direction by means of a driving bevel gear 39 having a rotary bearing 40 likewise a fixed part of the knee bridge 30. Gear 39 is turned by a crank handle (not shown) which may be applied to its shaft 41 in some accessible position outside of the knee of the milling machine or other part of a machine tool that is to be raised and lowered. This turns core section 26 of the jack screw while piston rod 20 and plug bushing 21 firmly fixed thereto are restrained from turning by the frictional resistance of piston packings 34 against the internal wall surface of cylinder 13. Thus upward or downward movement of core section 26 relative to the piston rod 20 and sometimes relative to shell 23 can be caused without hydraulic motivation of the piston. If the turning of core section 26 is sufficiently continued upward it will pick up and force to turn with it the shell section 24 of the composite jack screw 25. Thus the total extent of lift can be roughly the sum of the lengths of screw threads 27 and 23'.

The present improvements reside particularly in the provision and function of the plug bushing 21 which becomes fixed to the piston 20 by means of the fine-pitched fastening screw threads 22 which draw the top flange 19 of the plug bushing to a tight bind against the top end of the hollow piston rod. Bushing flange 19 may be provided with flats or be peripherally notched to receive a suitable wrench for tightening and loosening the same. The fixity of bushing 21 to piston rod 20 is thus strengthened by any turning tendency which the composite jack screw when working against load can impart to the piston rod if all translating screws involved are of the same handed thread.

Heretofore to serve the purpose of bushing 21 there have been proposed a multiplicity of assembled parts relying usually on the use of set screws to unite them fixedly. My improved construction produces greater solidity, strength and simplicity with greater dependability against accidental displacement of the internal translating threads 23 from fixed relationship to the piston rod 20 and it also strongly reinforces the tubular strength of the hollow piston at its top open end.

When a composite jack screw is not desired part 24 can be omitted and the external translating screw threads 27 on part 26 will be given meshing engagement directly with the internal translating screw threads 23 on plug bushing 21 being changed in size to mate therewith.

The appended claim is directed to and intended to cover such variations of the exact shapes and arrangement of parts herein illustrated and described as are made obvious by the foregoing disclosure of these new principles in machine construction.

I claim:

In a machine tool including a work table, a height conserving hydraulic jack for operating within restricted vertical height of jacking space under said table to elevate and lower the latter, comprising in combination, a vertically elongated cylinder forming an upstanding fluid pressure chamber confined to said restricted vertical height of jacking-space, a slide bearing in the top portion of said cylinder, a hydraulically motivated piston and piston rod in said chamber, an upper portion of said piston rod comprising an elongated open-ended shell having a thin tubular wall terminating at the top open end of said shell, said tubular wall being cylindrically smooth on its external surface to be slidably guided in said bearing, said shell having a counterbore in said open end and having internal holding screw threads of relatively low helical pitch in said counterbore and thereby weakening the shell without interrupting the cylindrical smoothness of said external surface of said wall, a hollow bushing plugging said counterbore having external holding screw threads fixedly enmeshed with said low pitched internal threads of said counterbore whereby to reinforce said weakened portion of said tubular wall, said bushing having internal translating screw threads of relatively steeper helical pitch and an external head flange of overall girth no greater than that of said cylindrically smooth surface of said tubular wall seated tightly against said open end of the latter, and a jack screw having external translating screw threads in working mesh with the translating threads of said bushing, whereby without extraneous fastening said bushing is held in fixed relation to said tubular wall while said jack screw is turned for elevating the work table.

References Cited in the file of this patent

UNITED STATES PATENTS

| 1,575,166 | Johnson et al. | Mar. 2, 1926 |
| 2,508,587 | Turchan et al. | May 23, 1950 |
| 2,603,235 | Kirkham | July 15, 1952 |

FOREIGN PATENTS

| 932,157 | Germany | Aug. 25, 1955 |